(12) United States Patent
Zenzen et al.

(10) Patent No.: US 8,517,152 B2
(45) Date of Patent: Aug. 27, 2013

(54) DISK BRAKE AND BRAKE PAD ARRANGEMENT THEREFOR

(75) Inventors: Guido Zenzen, Macken (DE); Marco Becker, Oberdürenbach (DE); Michael Schog, Mertloch (DE); Florian Rössinger, Neuwied (DE)

(73) Assignee: Lucas Automotive GmbH, Koblenz (DE)

( * ) Notice: Subject to any disclaimer, the term of this patent is extended or adjusted under 35 U.S.C. 154(b) by 162 days.

(21) Appl. No.: 13/129,871

(22) PCT Filed: Nov. 16, 2009

(86) PCT No.: PCT/EP2009/008150
§ 371 (c)(1),
(2), (4) Date: Jun. 8, 2011

(87) PCT Pub. No.: WO2010/057608
PCT Pub. Date: May 27, 2010

(65) Prior Publication Data
US 2011/0226566 A1 Sep. 22, 2011

(30) Foreign Application Priority Data
Nov. 20, 2008 (DE) .......................... 10 2008 058 265

(51) Int. Cl.
*F16D 65/092* (2006.01)
(52) U.S. Cl.
USPC ..................................... 188/73.38; 188/73.45
(58) Field of Classification Search
USPC ........... 188/73.35, 73.36, 73.37, 73.38, 73.45
See application file for complete search history.

(56) References Cited

U.S. PATENT DOCUMENTS

| 4,417,647 | A | * | 11/1983 | Cotter et al. | ............... 188/73.38 |
| 5,577,577 | A |   | 11/1996 | Hirai et al. | |
| 5,881,848 | A |   | 3/1999  | Mery et al. | |
| 7,431,132 | B2 |  | 10/2008 | Schog et al. | |
| 2007/0170018 | A1 | * | 7/2007 | Alexander | ................. 188/73.37 |
| 2007/0240946 | A1 |   | 10/2007 | Schorn et al. | |

FOREIGN PATENT DOCUMENTS

| DE | 2751673 A1 | 5/1978 |
| DE | 4126197 A1 | 2/1993 |
| DE | 4240872 A1 | 6/1994 |
| DE | 69515257 T2 | 10/2000 |
| DE | 19935036 C1 | 2/2001 |
| DE | 69616317 T2 | 7/2002 |
| DE | 10312479 A1 | 10/2004 |

(Continued)

*Primary Examiner* — Thomas J Williams
(74) *Attorney, Agent, or Firm* — MacMillan, Sobanski & Todd, LLC

(57) ABSTRACT

The invention relates to a disk brake for a motor vehicle brake system having a frame-type housing, at least two brake pad arrangements, which are accommodated in the frame-type housing and between which a brake disk that is rotatable about an axis of rotation may be accommodated, and at least two guide bolts, which are mounted on the housing and on which at least one of the brake pad arrangements is guided with play in an axially displaceable manner. To avoid undesirable noises in this disk brake it is provided that on the brake pad arrangement guided on the guide bolts at least one spring element is mounted, which biases said brake pad arrangement relative to the guide bolts into a position corresponding to a tilting movement that results during braking of the brake disk from a braking torque acting on the brake pad arrangement.

13 Claims, 6 Drawing Sheets

(56) References Cited

FOREIGN PATENT DOCUMENTS

| | | |
|---|---|---|
| DE | 60317116 T2 | 8/2008 |
| FR | 2371606 A1 | 6/1978 |
| FR | 2735195 A1 | 12/1996 |
| JP | 04025627 A * | 1/1992 |
| JP | 09042337 | 2/1997 |
| WO | 2005064188 A1 | 7/2005 |

* cited by examiner

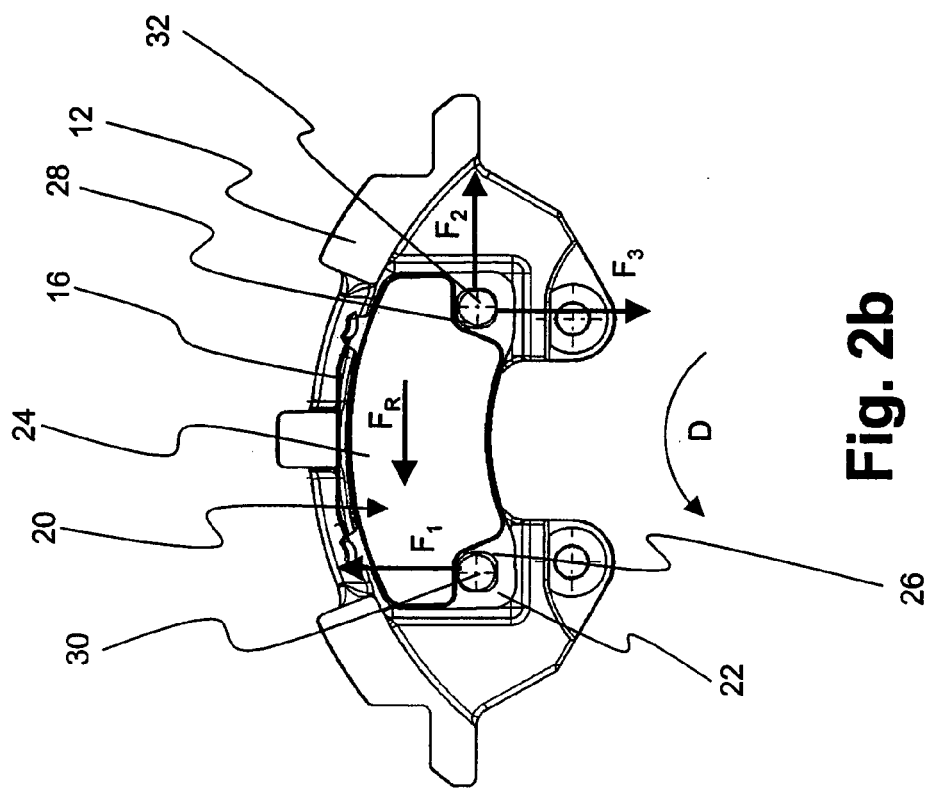
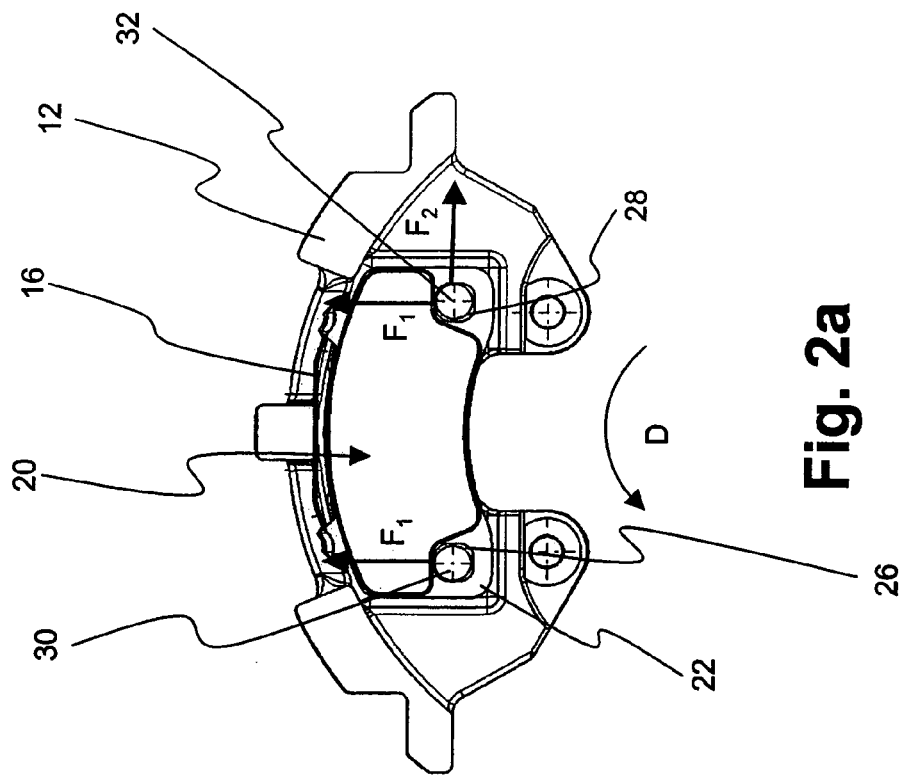

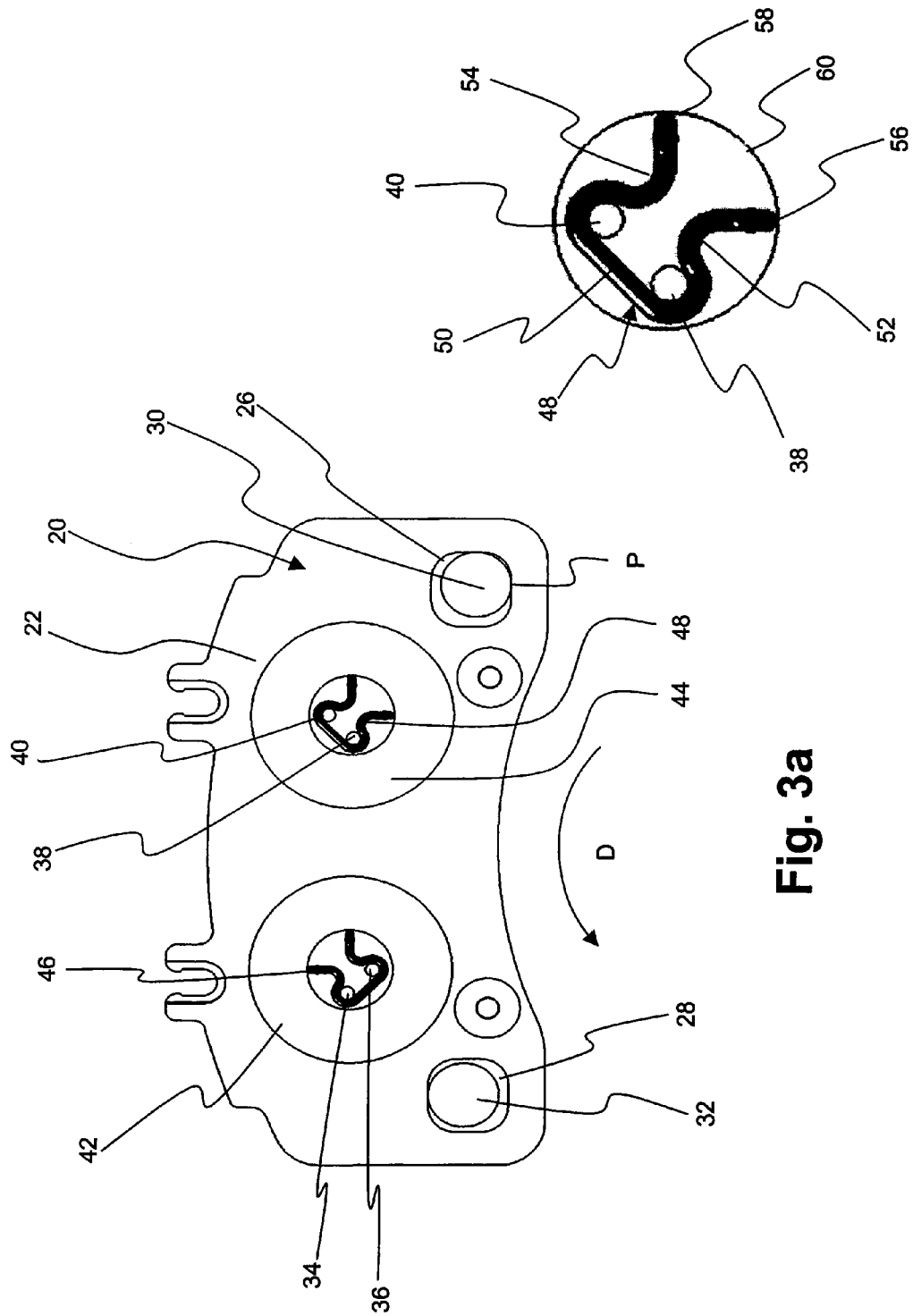

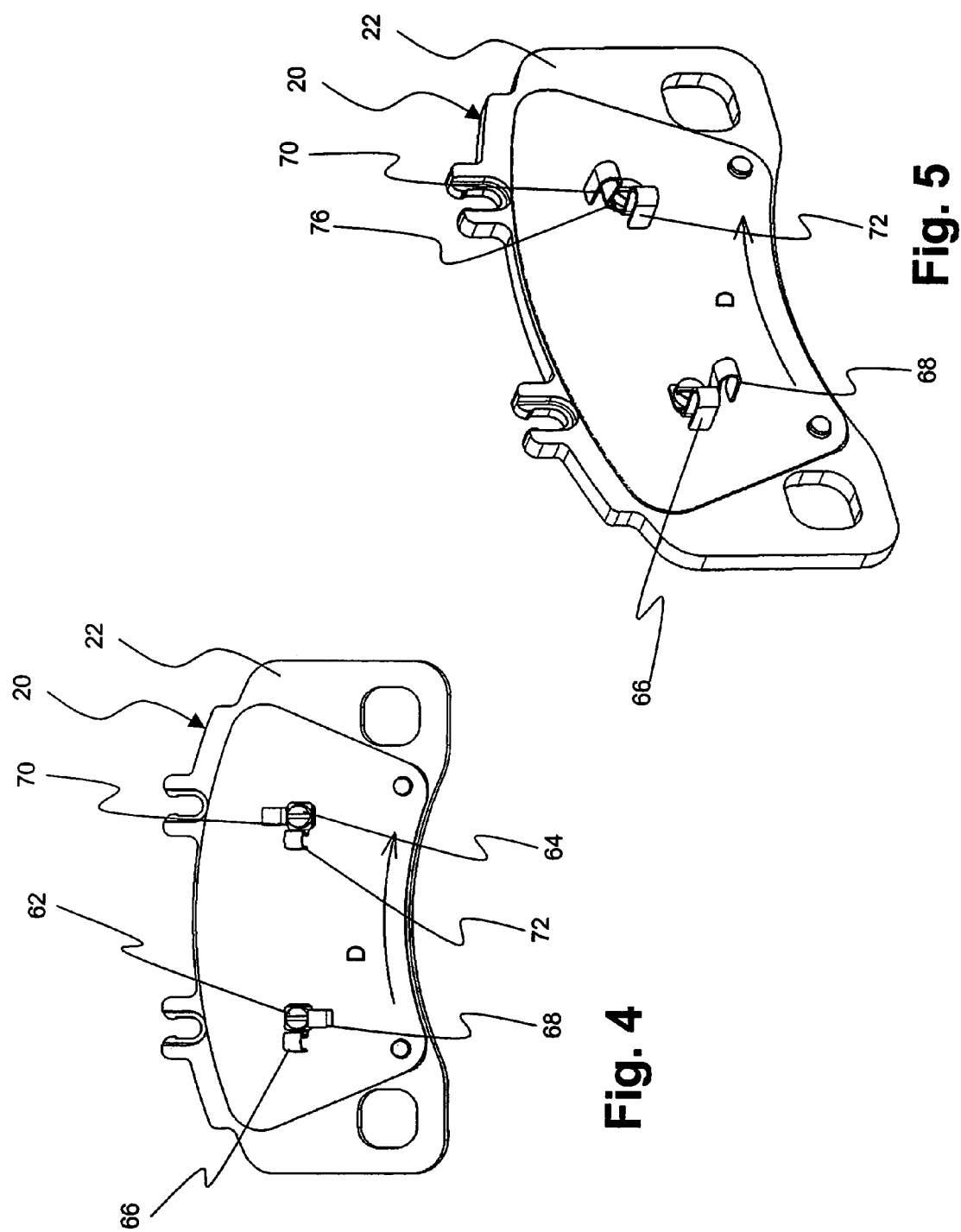

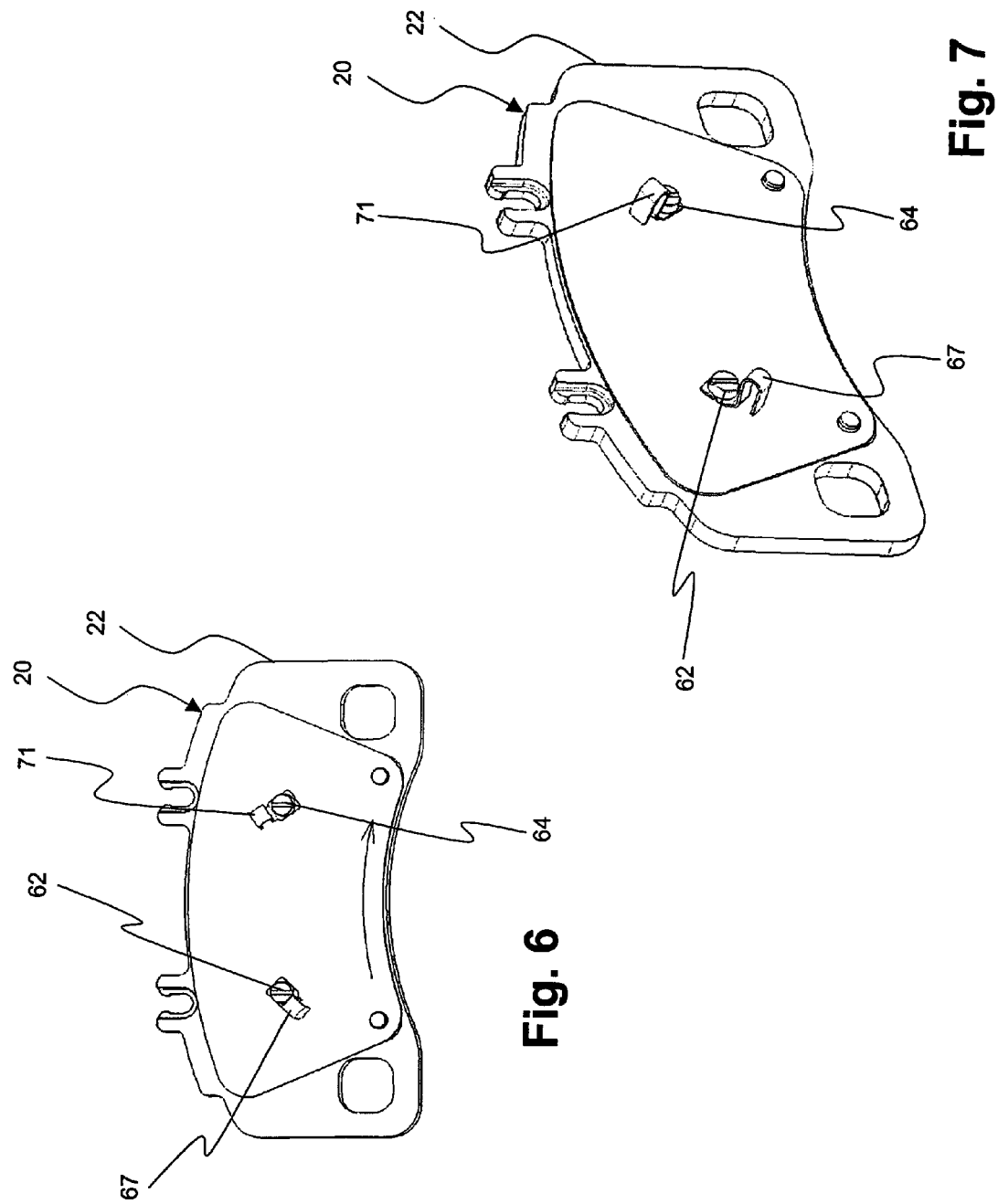

DISK BRAKE AND BRAKE PAD ARRANGEMENT THEREFOR

CROSS-REFERENCE TO RELATED APPLICATIONS

This application is a national stage of International Application No. PCT/EP2009/008150 filed Nov. 16, 2009, the disclosures of which are incorporated herein by reference in entirety, and which claimed priority to German Patent Application No. 10 2008 058 265.4 filed Nov. 20, 2008, the disclosures of which are incorporated herein by reference in entirety.

BACKGROUND OF THE INVENTION

The present invention relates to a disk brake for a motor vehicle brake system having a frame-type housing, at least two brake pad arrangements, which are accommodated in the frame-type housing and between which a brake disk that is rotatable about an axis of rotation may be accommodated, and at least two guide bolts, which are mounted on the housing and on which at least one of the brake pad arrangements is guided with play in an axially displaceable manner.

Such disk brakes are prior art.

Thus, for example the document DE 103 12 479 A1, and corresponding U.S. Pat. No. 7,431,132 B2, both of which are incorporated by reference herein, describes a disk brake, in which brake pad arrangements are guided displaceably on guide bolts. One of the brake pad arrangements is displaced by means of an actuating piston in the housing. The entire disk brake operates according to the floating caliper principle.

For positioning brake pad arrangements inside a housing of a disk brake it is moreover customary to use hold-down springs for the brake pad arrangements. Such a hold-down spring arrangement is known from the document DE 199 35 036 C1. In this document individual brake pad arrangements in the housing are pressed by a bow-shaped spring down onto the guide bolts in radial direction relative to the axis of rotation of the disk brake. The guide bolts in this case penetrate recesses in the brake pad arrangements with play. It has however emerged that in dependence upon the magnitude of the braking torque acting upon the respective brake pad the brake pad arrangement may shift relative to the guide bolts within the existing play. This then leads to a phenomenon whereby at low braking torques the respective brake pad arrangement are pressed by the hold-down spring from above onto the guide bolts and held in contact therewith. However, as soon as the braking torque increases and an ensuing tilting moment in relation to the guide bolts acts upon the respective brake pad arrangement, a state is reached, in which the forces exerted by the hold-down spring on the respective brake pad arrangement are overcome and so the respective brake pad arrangement tilts. Finally the brake pad arrangement tilts within the play between guide bolt and guide bolt recess of the brake pad arrangement to such an extent that the edge of the recess strikes against the guide bolt. This striking may lead to undesirable noise, which is perceived by the driver of the vehicle and may convey to him the impression of malfunctioning of the brake system. The same applies to the situation, in which the brake is released, so that the braking torque is reduced more or less abruptly and because of the action of the pad-retaining spring the respective brake pad arrangement is moved back into its normal position. Here too, the relative movement within the play between guide bolt and guide bolt recess in the brake pad arrangement occurs and finally leads similarly to a noise-inducing audible striking of the guide bolt against the guide bolt recess.

BRIEF SUMMARY OF THE INVENTION

A feature of the present invention is to provide a disk brake of the type described in the introduction, in which such undesirable noises are effectively prevented.

This feature is achieved by a disk brake of the type described in the introduction, in which it is provided that on the brake pad arrangement guided on the guide bolts at least one spring means is mounted, which biases said brake pad arrangement relative to the guide bolts into a position corresponding to a tilting movement that results during braking of the brake disk from a braking torque acting on the brake pad arrangement.

According to the invention it is accordingly provided that the brake pad arrangement is correspondingly biased by means of the at least one spring means in such a way that no relative movement nor any abrupt noise-inducing striking as a result of the increasing or, in the case of release of the brake, decreasing braking torque may occur. Thus, disturbing noises caused by such striking are effectively prevented.

According to a development of the invention it may be provided that the brake pad arrangement comprises at least one brake pad carrier and a brake pad disposed at the side of the brake pad carrier facing the brake disk, wherein the at least one spring means is disposed at the side of the brake pad carrier remote from the brake pad. It is self-evident that according to the invention it is also possible for a plurality of spring means to be formed on the brake pad carrier. The brake pad carrier may in turn be manufactured for example from a plate-shaped metal element, in which the guide bolt recesses for receiving the guide bolts may be formed.

According to the invention it may be provided that the brake pad arrangement is displaceable on the guide bolts by means of a displaceable actuator, wherein the at least one spring means acts on the actuator. In this connection it may be provided that the actuator comprises at least one brake piston, which is designed with a hollow end and into which the at least one spring means engages. The hollow space formed in the brake piston may therefore be used effectively to accommodate the at least one spring means.

A preferred constructional variant of the invention provides that the spring means biases the brake pad arrangement in various directions, for example both in radial direction and in peripheral direction relative to the axis of rotation. Preferably in this case the direction of the tensioning effect of the spring means is selected in such a way that it biases the brake pad arrangement in a direction corresponding to a displacement such as arises because of an increasing braking torque counter to the action of a hold-down spring or an otherwise determined normal position, so that abrupt noise-inducing displacement may be prevented.

According to a constructional variant of the invention it may be provided that the spring means is manufactured from a spring steel sheet. In this case it is possible for the spring means to comprise at least one spring arm, which extends in an arc-shaped manner and is fastened by a base to the brake pad carrier. It may further be provided that two or more spring means are mounted by their respective base adjacent to one another on the brake pad carrier, wherein their spring arms extend at an angle to one another. The bases of these spring means may be fastened in an as-it-were "stacked" manner on the brake pad carrier. To fasten one or more bases a screw, a rivet, a (spot-) welded joint or the like may be used. Depending on requirements and the desired alignment of force, the spring arms may be oriented in a predetermined angular position relative to one another or/and to the brake pad carrier and be fixed on the brake pad carrier. Alternatively it may be provided that the spring means comprises at least two spring arms, which extend in an arc-shaped manner and are disposed at an angle of approximately 90° to one another and fastened by a common base to the brake pad carrier. By using one or more spring means with a plurality of spring arms a predetermined tilting moment may be exerted on the respective brake pad arrangement.

It may further be provided that the spring means is manufactured from a spring wire. In this case, according to the invention it is possible for the spring means to engage in a clamp-like manner around rear fastening pins on the brake pad carrier and to form spring arms with its free ends. According to the invention it may further be provided that the spring wire is conveyed around the respective guide bolt and extends with an elastically deformable portion in the direction of a fastening region on the brake pad carrier, at which the spring wire is mounted on the brake pad carrier. The spring wire may be approximately Ω-shaped, however other kinds of shape are also conceivable. The important point is that the spring means is elastically deformable in order to enable deployment of its spring action.

For mounting purposes it may be provided that the spring wire is clamped round the edge of the brake pad carrier at the fastening region thereof.

The invention further relates to a brake pad arrangement for a disk brake of the previously described type, comprising a brake pad carrier, on which a brake pad is mounted, wherein the brake pad carrier has at least two guide openings that are designed to receive in each case a guide bolt, on which they are axially guided upon an actuation of the disk brake, wherein the brake pad arrangement comprises at least one spring means that biases it into a position corresponding to a tilting movement relative to the guide bolts that results during braking of the brake disk from a braking torque acting on the brake pad arrangement.

Other advantages of this invention will become apparent to those skilled in the art from the following detailed description of the preferred embodiments, when read in light of the accompanying drawings.

BRIEF DESCRIPTION OF THE DRAWINGS

FIG. 2a is a view of a conventional brake pad arrangement in the disk brake according to FIG. 1 in a low braking torque situation;

FIG. 2b is a view corresponding to FIG. 2a representing the high braking torque situation;

FIG. 3a is a view of a brake pad arrangement according to a first constructional variant of the invention;

FIG. 3b is an enlarged detail of FIG. 3a illustrating the spring means;

FIGS. 4 and 5 are views of a brake pad arrangement of a second embodiment of the invention;

FIGS. 6 and 7 are views of a brake pad arrangement of a third embodiment of the invention;

DETAILED DESCRIPTION OF THE INVENTION

Figure 1:
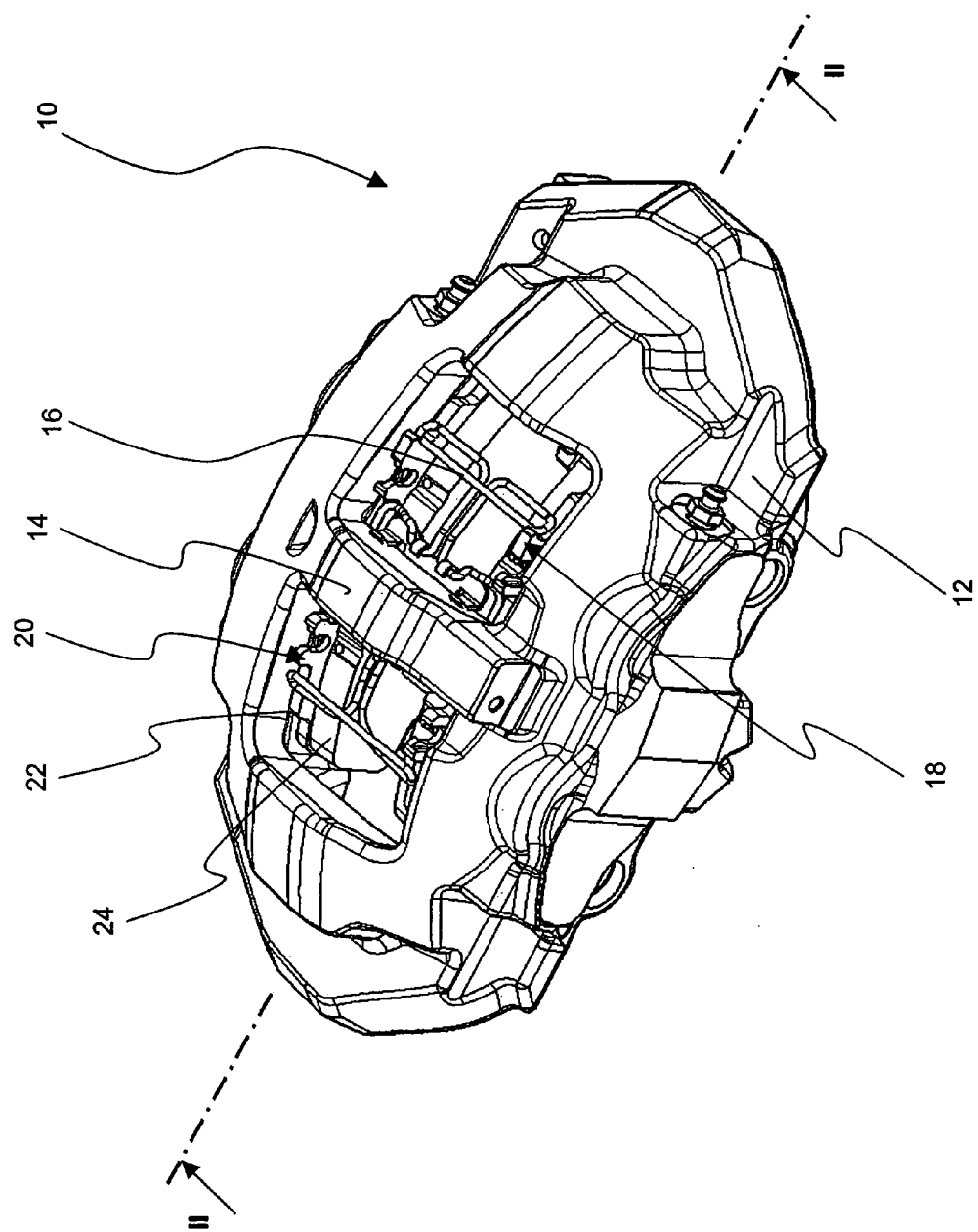
FIG. 1 is a perspective view of a disk brake according to the invention with corresponding brake pad arrangements.

FIG. 1 shows an as such known disk brake 10 in a perspective view. It comprises a housing 12 with a cross-member 14.

On the housing cross-member 14 a pad-retaining spring arrangement 16 is disposed. This engages around the cross-member 14. The pad-retaining spring arrangement 16, also called hold-down spring, presses from above upon brake pad arrangements 18, 20. Each brake pad arrangement 18, 20 comprises a plate-like brake pad carrier 22 and a brake pad 24 mounted thereon. A brake disk, which is not shown in FIG. 1, extends in a conventional manner between the two brake pad arrangements 18, 20 and is connected in a rotationally fixed manner to a vehicle wheel that is to be braked.

FIG. 2a shows a partial section according to the cutting line II-II through the disk brake 10. It is evident that the brake pad arrangement 20, more precisely the brake pad carrier 22, has in each of its bottom corner regions recesses 26, 28, through which guide bolts 30, 32 extend. The recesses 26, 28 are dimensioned with slight play relative to the guide bolts 30, 32, thereby allowing the brake pad arrangement 20 to be easily displaced on the guide bolts 30, 32.

In FIG. 2a the direction of rotation D, in which a brake disk to be braked rotates during forward travel of the vehicle, is also indicated. The braking torque is also in a corresponding direction. Because of the action of the hold-down spring 16 the brake pad arrangement 20 is pressed by the force $F_1$ onto the two bolts 30 and 32, so that underneath the bolts there is play between the bolts 30 and 32 and the opposite region of the edge of the recesses 26 and 28. If the brake is lightly applied so that a relatively low braking torque acts on the brake pad arrangement 20, then the force $F_2$ is additionally effective, which ensures that the brake pad arrangement 20 also rests additionally on the right against the bolt 30 and/or 32.

If in this as such known arrangement the braking torque is then increased, the result is a tilting moment upon the brake pad arrangement 20, wherein the action of the hold-down spring 16 is overcome. This tilting moment arises from the relatively high frictional force $F_R$ that is generated by application of the brake pad 24 of the brake pad arrangement 20. Because of this tilting moment a relative movement between the brake pad arrangement 20 and the bolt 32 occurs. More precisely, the brake pad arrangement 20 rotates because of the tilting moment counter to the action of the hold-down spring 16 around the bolt 30 so that finally, with exhaustion of the play between the bolt 32 and the recess 28, the edge of the recess 28 comes to rest against the bottom region of the bolt 32. In the background art this relative displacement of the brake pad arrangement 20 relative to the bolts 30, 32 from the state according to FIG. 2a into the state according to FIG. 2b would occur without damping and hence with considerable noise development.

The invention takes account of this noise development by preventing such an abrupt displacement of the brake pad arrangements on the bolts.

FIG. 3a shows a view of a brake pad arrangement according to the invention at the side of the brake pad carrier 22 remote from the brake pad. It may be seen how the two recesses 26 and 28 of the brake pad carrier are penetrated with play by the two bolts 30 and 32 (here, because of the reverse view, mirror-inverted compared to the view according to FIGS. 2a and 2b). Mounted on the rear of the brake pad carrier 22 are fastening pins 34, 36, 38, 40. It is further evident that acting on the rear of the brake pad carrier are pistons 42, 44, which are each hollow-cylindrical at their front end and in a known manner are arranged so as to be hydraulically displaceable in the housing 12 of the disk brake 10. Spring elements 46 and 48 are disposed respectively on the pins 34, 36 and 38, 40

The spring element 48 is described in detail with reference to FIG. 3b. It comprises a clamp-like portion 50 that engages around the two fastening pins 38, 40. Adjoining the clamp-like portion 50 are two limbs 52, 54, which extend in an arc-shaped manner and hence form a constriction similar to the Greek letter "Ω". The clamp-like portion 50 and the two limbs 52 extend approximately in the drawing plane. The free ends 56, 58 of the spring element 48 extend out of the drawing plane into the end opening 60 of the hollow piston 44 (see FIG. 3a). The free ends 56, 58 rest under bias against the cylindrical wall delimiting the opening 60 and hence tension the brake pad arrangement 20 even in an unloaded or only slightly loaded operating situation into a position that corresponds to the position according to FIG. 2b. This means that an abrupt displacement within the play between the bolts 30, 32 and the recesses 26, 28 that leads in the background art to the undesirable noise development cannot occur. Rather, this displacement is already anticipated by the bias by means of the spring elements 46 and 48, so that even without any braking action contact occurs at the contact point P. Thus, according to the invention action may be taken against undesirable noise development.

FIGS. 4 and 5 show an alternative embodiment of the brake pad arrangement according to the invention. Instead of the clamps 46 and 48 formed from a spring wire, in the constructional variant according to FIGS. 4 and 5 spring elements 62 and 64 made from spring steel, for example from a spring steel strip material, are mounted by means of screws on the rear of the pad carrier 22 of the brake pad arrangement 20. These spring elements each comprise two spring arms 66, 68 and 70, 72, which are arranged in pairs at an angle of 90° to one another and provide for a bias as in the description relating to FIGS. 3a and 3b. The spring arms 66, 68 and/or 70, 72, starting from a base 74 and/or 76, are each of an arc-shaped and inherently resilient configuration. The mode of operation is the same as described with reference to FIGS. 3a and 3b.

FIGS. 6 and 7 show a further constructional variant of the invention.

This differs from the embodiment according to FIGS. 4 and 5 merely in that in each case only one arc-shaped spring arm 67, 71 on each spring element 62, 64 is mounted by means of a screw on the brake pad carrier 22. Compared to the previously described embodiment the alignment of the spring arms 67, 71 is oblique, thereby leading to a resultant spring force, which in its direction corresponds to that in the embodiment according to FIGS. 4 and 5.

It should moreover be pointed out that a "multi-arm solution", such as is shown in FIGS. 4 and 5, is possible also by "stacking" a plurality of one-armed spring elements according to FIGS. 6 and 7 with an angular offset.

Figure 9:
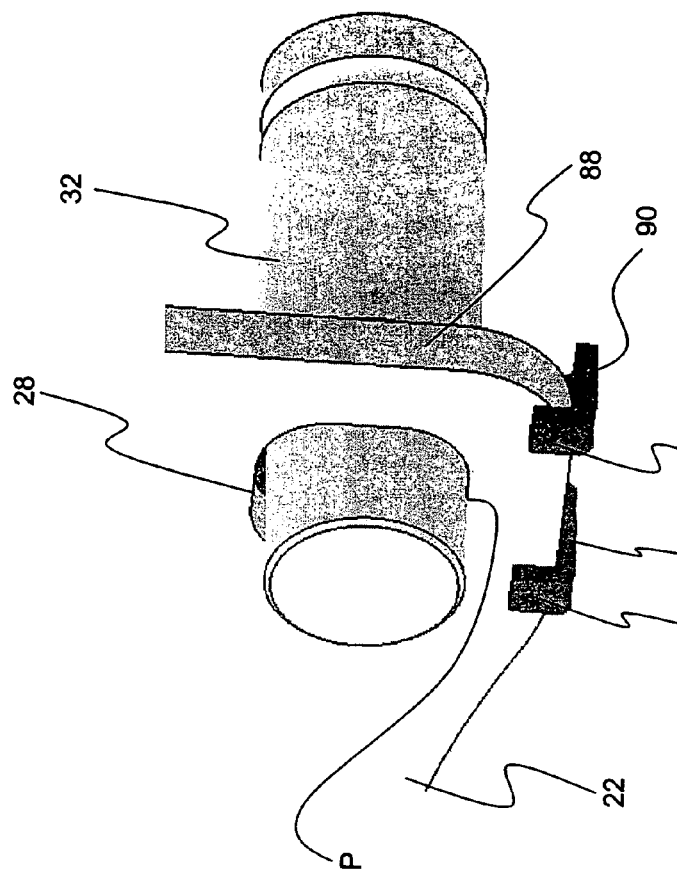
FIGS. 8 and 9 are views of a brake pad arrangement of a fourth embodiment of the invention and of a guide bolt.
Figure 8:
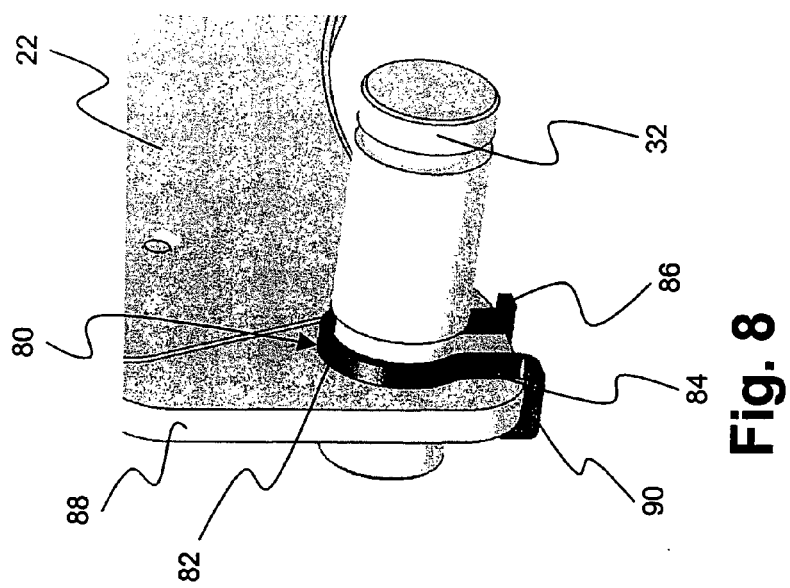

FIGS. 8 and 9 show a fourth constructional variant of the invention.

Here, it may be seen that on the bolt 32, which is guided in the recess 28, a spring element 80 formed from a spring wire is disposed in such a way that this spring element 80 is wrapped by a loop portion 82 around the bolt 32, a constriction below the bolt 32 being provided, from which two limbs 84, 86 emanate and verge into portions 90, 92, which run along the edge 88 of the brake pad carrier 22. These portions 90 and 92 have on their free ends gripper portions 94, 96, which are bent at an angle and engage behind the brake pad carrier 22.

Viewed in the direction of the longitudinal axis of the bolt 32, the spring 80 is therefore Ω-shaped. By virtue of the constricted transitional area between the portion 82 and the limbs 84, 86 the spring element is elastically deformable, i.e. malleable, orthogonally to the longitudinal axis of the bolt 32, and hence provides for a rapprochement effect between the bolt 32 and the brake pad carrier 22. This rapprochement effect is so directed that the bolt 32 comes into contact at its underside with the edge of the recess 28 in the region of the contact point P.

The development of the spring element 80 according to FIGS. 8 and 9 also makes it possible to achieve a purposeful pre-positioning of the brake pad carrier 22 relative to the bolt 32 so that abrupt noise-inducing relative movements between these two components may be prevented.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Disk brake for a motor vehicle brake system having:
   a housing,
   at least two brake pad arrangements, which are accommodated in the housing and between which a brake disk that is rotatable about an axis of rotation may be accommodated, and
   at least two guide bolts, which are mounted on the housing and on which at least one of the brake pad arrangements is guided with play in an axially displaceable manner,
   wherein on the brake pad arrangement guided on the guide bolts at least one spring means is mounted directly thereon, which biases the brake pad arrangement relative to the guide bolts into a position corresponding to a tilting movement that results during braking of the brake disk from a braking torque acting on the brake pad arrangement,
   wherein the brake pad arrangement comprises at least one brake pad carrier and a brake pad disposed at a first side of the brake pad carrier facing the brake disk, wherein the at least one spring means is disposed at a second side of the brake pad carrier which is opposite to the first side at which the brake pad is disposed.

2. Disk brake according to claim 1,
   wherein the brake pad arrangement is displaceable on the guide bolts by means of a displaceable actuator, wherein the at least one spring means acts on the actuator.

3. Disk brake according to claim 2,
   wherein the actuator comprises at least one brake piston, which is designed with a hollow end and into which the at least one spring means engages.

4. Disk brake according to claim 1,
   wherein the at least one spring means biases the brake pad arrangement both in radial direction and in peripheral direction relative to the axis of rotation.

5. Disk brake according to claim 1,
   wherein the at least one spring means is manufactured from a spring steel sheet.

6. Disk brake according to claim 5,
   wherein the spring means comprises at least one spring arm, which extends in an arc-shaped manner and is fastened by a base to the brake pad carrier.

7. Disk brake according to claim 6,
   wherein two or more spring means are mounted by their respective base adjacent to one another on the brake pad carrier, wherein their spring arms extend at an angle to one another.

8. Disk brake according to claim 6,
   wherein the spring means comprises two spring arms, which extend in an arc-shaped manner and at the base are disposed at an angle of approximately 90°.

9. Disk brake according to claim 1, wherein the at least one spring means is manufactured from a spring wire.

10. Disk brake according to claim 9, wherein the at least one spring means clampingly engages around rear fastening pins on the brake pad carrier and free ends thereof form spring arms.

11. Disk brake according to claim 9, wherein the spring wire is conveyed around the respective guide bolt and extends with an elastically deformable portion in the direction of a fastening region on the brake pad carrier, at which the spring wire is mounted on the brake pad carrier.

12. Disk brake according to claim 11, wherein the spring wire is clamped round an edge of the brake pad carrier at the fastening region thereof.

13. Brake pad arrangement for a disk brake comprising a brake pad carrier, on which a brake pad is mounted, wherein the brake pad carrier has at least two guide openings that are designed to receive in each case a guide bolt, on which they are axially guided upon an actuation of the disk brake, wherein the brake pad arrangement comprises at least one spring means mounted directly thereon that biases the brake pad arrangement relative to the guide bolts into a position corresponding to a tilting movement that results during braking of the brake disk from a braking torque acting on the brake pad arrangement, wherein the brake pad is disposed at a first side of the brake pad carrier facing the brake disk and the at least one spring means is disposed at a second side of the brake pad carrier which is opposite to the first side at which the brake pad is disposed.

\* \* \* \* \*